(No Model.)
W. M. REED.
LEMONADE SHAKER.
No. 281,925. Patented July 24, 1883.
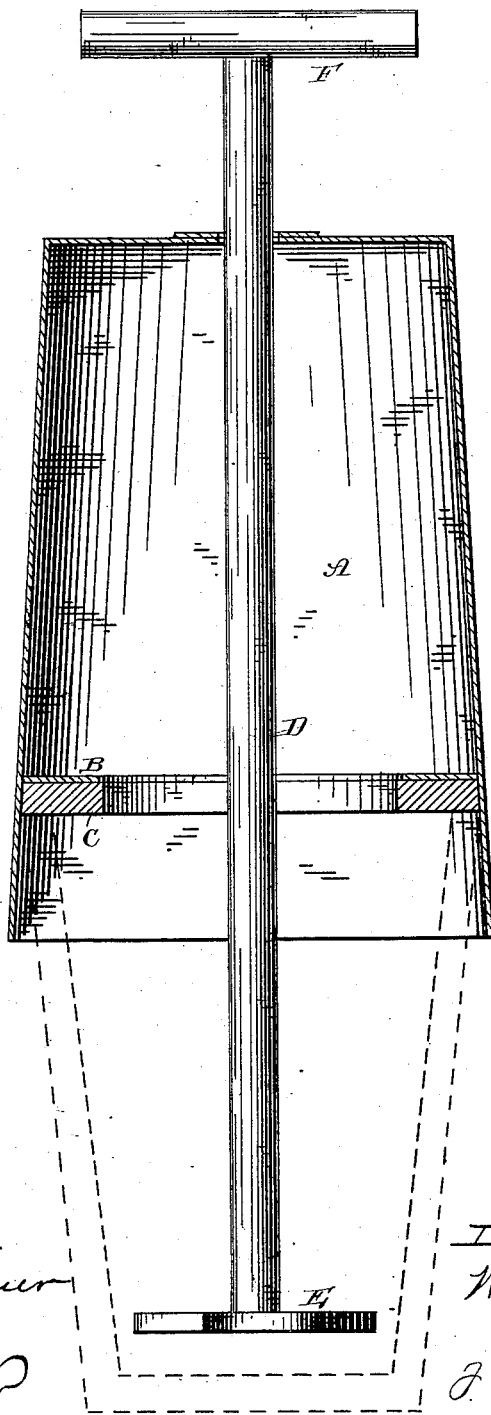
Witnesses.
Louis F. Gardner
J. W. Garner
Inventor.
W. M. Reed,
per
J. A. Lehmann,
Att'y

UNITED STATES PATENT OFFICE.

WILLIAM M. REED, OF GENEVA, INDIANA.

LEMONADE-SHAKER.

SPECIFICATION forming part of Letters Patent No. 281,925, dated July 24, 1883.

Application filed May 17, 1883. (No model.)

*To all whom it may concern:*

Be it known that I, W. M. REED, of Geneva, in the county of Adams and State of Indiana, have invented certain new and useful Improvements in Lemonade-Shakers; and I do hereby declare the following to be a full, clear, and exact description of the invention, such as will enable others skilled in the art to which it pertains to make and use it, reference being had to the accompanying drawing, which forms part of this specification.

My invention relates to an improvement in lemonade-shakers; and it consists in combining a suitably-shaped vessel that is adapted to be applied to the edge of a glass, and a ring or packing for forming a tight joint with the glass, and a reciprocating plunger or dasher for agitating the contents of the glass or of the vessel, as will be more fully described hereinafter.

The accompanying drawing represents a vertical sectional view of my invention, the glass being indicated in dotted lines.

A represents a vessel, which is preferably slightly conical in shape, as here shown, which has its lower end open and its upper end closed, and which is provided with an annular flange, B, on its inner side, at a suitable distance from the bottom, to which flange is secured in any suitable manner a ring or rubber or other packing, C, for the purpose of forming a tight joint with the glass.

Extending through an opening formed in the top of the cone is a dasher-rod, D, which is provided at its lower end with a dasher, of any suitable construction, E, and at its upper end with a handle, F.

The operation of my invention will be very readily understood from the foregoing description, and by reference to the accompanying drawing.

Having thus described my invention, I claim—

The combination of a vessel of suitable shape that is adapted to be applied to glasses or other vessels, and which is provided with an interior bearing-flange, a suitable packing for forming a tight joint with the glass, with a reciprocating dasher for agitating the contents of the glass, substantially as described.

In testimony whereof I affix my signature in presence of two witnesses.

WILLIAM M. REED.

Witnesses:
  P. B. MANLY,
  CHAS. H. MURRAY.